US011117345B2

(12) United States Patent
Nishimura et al.

(10) Patent No.: US 11,117,345 B2
(45) Date of Patent: Sep. 14, 2021

(54) NONWOVEN FABRIC FOR REINFORCING FOAM MOLDED ARTICLES

(71) Applicant: TOYOBO CO., LTD., Osaka (JP)

(72) Inventors: Hiroaki Nishimura, Osaka (JP); Takashi Koida, Osaka (JP); Shinichiro Inatomi, Osaka (JP); Mariko Matsui, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 245 days.

(21) Appl. No.: 16/078,404

(22) PCT Filed: Feb. 28, 2017

(86) PCT No.: PCT/JP2017/007628
§ 371 (c)(1),
(2) Date: Aug. 21, 2018

(87) PCT Pub. No.: WO2017/150488
PCT Pub. Date: Sep. 8, 2017

(65) Prior Publication Data
US 2019/0054715 A1     Feb. 21, 2019

(30) Foreign Application Priority Data
Feb. 29, 2016   (JP) .............................. JP2016-037037

(51) Int. Cl.
*B32B 27/12*   (2006.01)
*B32B 5/24*    (2006.01)
(Continued)

(52) U.S. Cl.
CPC .............. *B32B 5/245* (2013.01); *B29C 39/10* (2013.01); *B29C 48/154* (2019.02); *B32B 5/022* (2013.01); *B32B 5/18* (2013.01); *B32B 5/24* (2013.01); *B32B 27/12* (2013.01); *B29C 44/00* (2013.01); *B29K 2023/083* (2013.01); *B29K 2105/0085* (2013.01); *B29K 2105/04* (2013.01)

(58) Field of Classification Search
CPC ................................. B32B 5/24; B32B 27/12
See application file for complete search history.

(56) References Cited

U.S. PATENT DOCUMENTS

2006/0172636 A1* 8/2006 Bech ...................... B29C 70/202
                                                                  442/1
2007/0036979 A1* 2/2007 Roding ................... B60R 13/02
                                                                  428/411.1
(Continued)

FOREIGN PATENT DOCUMENTS

JP    62-111705   5/1987
JP    07-31322    6/1995
(Continued)

OTHER PUBLICATIONS

Japan Patent Office, International Search Report for PCT/JP2017/007628 dated May 23, 2017 with English Translation.

*Primary Examiner* — Andrew T Piziali
(74) *Attorney, Agent, or Firm* — Fish & Richardson P.C.

(57) ABSTRACT

The problem of the present invention is to offer a nonwoven fabric for reinforcing foam molded articles that enables cushion materials to be efficiently foam molded by improving adhesiveness of the reinforcing nonwoven fabric to a mold.
The present invention is a nonwoven fabric for reinforcing foam molded articles, having a reinforcing nonwoven layer and at least one resin layer, wherein the reinforcing nonwoven layer and the at least one resin layer are laminated, the reinforcing nonwoven layer has a discontinuous part including a magnetic material, the at least one resin layer has a resin having softening point A of 20° C. or higher and 60° C. or lower, and the nonwoven fabric has an air permeability of 30 cc/cm²/sec or more and 300 cc/cm²/sec or less.

11 Claims, 2 Drawing Sheets

(51) Int. Cl.
*B29C 39/10* (2006.01)
*B29C 48/154* (2019.01)
*B32B 5/02* (2006.01)
*B32B 5/18* (2006.01)
*B29C 44/00* (2006.01)
*B29K 23/00* (2006.01)
*B29K 105/00* (2006.01)
*B29K 105/04* (2006.01)

(56) References Cited

U.S. PATENT DOCUMENTS

2010/0102599 A1* 4/2010 Itou .................. B29C 33/10
 297/180.14
2012/0119558 A1* 5/2012 Ichikawa ............... D04H 1/498
 297/452.1
2012/0286445 A1 11/2012 Ohta
2016/0039154 A1 2/2016 Mogi
2017/0282490 A1* 10/2017 Koida ..................... B32B 3/10

FOREIGN PATENT DOCUMENTS

| | | |
|---|---|---|
| JP | 2000-280272 | 10/2000 |
| JP | 2001-252930 | 9/2001 |
| JP | 2004-358916 | 12/2004 |
| JP | 2008-126633 | 6/2008 |
| JP | 2008-194957 | 8/2008 |
| JP | 2016-36463 | 3/2016 |
| WO | 2011/093386 | 8/2011 |
| WO | 2016/035732 | 3/2016 |

* cited by examiner

NONWOVEN FABRIC FOR REINFORCING FOAM MOLDED ARTICLES

TECHNICAL FIELD

The present invention relates to a nonwoven fabric for reinforcing foam molded articles, and more specifically, relates to the most suitable nonwoven fabric for reinforcing foam molded articles that is superior in adhesiveness to a mold while foaming.

BACKGROUND ART

In recent years, urethane foam molded articles have been widely used as cushion materials for seats and others. Generally, a urethane foam molded article that is integrated with a reinforcing nonwoven fabric while molded is used. The nonwoven fabric is placed between the urethane foam molded article and a metal spring of car seats to play a role of protecting the urethane foam molded article from friction caused by the metal spring as well as spreading cushioning action of the metal spring evenly. To produce cushion materials using the reinforcing nonwoven fabric, the reinforcing nonwoven fabric is punched or cut so as to fit in the shape of cushion that is to be produced, and then, sewn. Further, holes for setting to a mold are made in the reinforcing nonwoven fabric. Subsequently, setting jigs such as protrusions or pins attached to the mold are stuck to the holes so that the reinforcing nonwoven fabric is set to the mold, after which urethane is foamed, and finally urethane foam molded articles are produced.

In recent years, the shape of car seats has become complex because various sensors and functions are attached to them, which causes greater burden such as sewing of reinforcing nonwoven fabrics, and as a result, man-hours and costs have increased. As mentioned above, setting of the reinforcing nonwoven fabric to a mold is one of the burden, and all kinds of efforts have been made. Examples include methods of: utilizing magnetic force between staples or pieces of metal attached to the reinforcing nonwoven fabric and magnets or others attached to the mold; and applying adhesive agent to the reinforcing nonwoven fabric or the mold.

The method of attaching staples, pieces of metal, and others causes high costs of a mold because magnetic force such as magnet should be previously attached to the mold, while the method of applying adhesive agent has a problem of contaminating the mold.

Patent Document 1 proposes a method for setting a reinforcing nonwoven fabric to a foaming mold by previously attaching setting pins in the foaming mold. By this method, however, the setting pins should be attached to different molds every time the shape of urethane foam changes, and also the reinforcing nonwoven fabric may be damaged when being taken out from the mold after foaming.

Patent Document 2 proposes a method of attaching magnetic force by previously mixing iron powder or iron sand in binder used in reinforcing nonwoven fabrics. This method, however, may cause abnormal noise or contamination of car interior, because iron powder or ion sand make contact with the metal spring to drop off. Furthermore, the method also has problems which are difficult to be detected that pieces of metal are mixed in the reinforcing nonwoven fabrics such as needle-punching needles used in producing process of the reinforcing nonwoven fabrics.

Patent Document 3 proposes a method for setting a reinforcing nonwoven fabric to a mold by attaching metal wire to the reinforcing nonwoven fabric to be attracted by a permanent magnet installed in the foaming mold. This method, however, also has problems of increasing processes of attaching metal wire as well as installing permanent magnet in the foaming mold.

RELATED ART DOCUMENTS

Patent Documents

Patent Document 1: JP-A-2004-358916
Patent Document 2: JP-A-2001-252930
Patent Document 3: JP-A-2008-194957

SUMMARY OF THE INVENTION

Problems to be Solved by the Invention

With a conventional and not refined mold, any method that enabled reinforcing nonwoven fabrics to be easily set to the mold without contaminating the mold was not proposed conventionally. The present invention has been made in the background of the related art, and the problem of the present invention is to offer a nonwoven fabric for reinforcing foam molded articles that enables cushion materials to be efficiently foam molded by improving adhesiveness of the reinforcing nonwoven fabric to a mold.

Means for Solving the Problems

The present inventors carried out intensive studies and found out that the reinforcing nonwoven fabric is extremely easily set to a mold by carrying out a combination of the following steps of applying resin which bonds the reinforcing nonwoven fabrics to a mold at the temperature of 60° C. or more to the reinforcing nonwoven fabrics in advance, raising the mold temperature up to 60° C. or more, which is normal for producing urethane foam molded articles by foaming the urethane, and further installing magnetic materials in the reinforcing nonwoven fabrics.

Namely, the present invention is as follows.

[1] A nonwoven fabric for reinforcing foam molded articles, comprising a reinforcing nonwoven layer and at least one resin layer, wherein
the reinforcing nonwoven layer and the at least one resin layer are laminated,
the reinforcing nonwoven layer comprises a discontinuous part including a magnetic material,
the at least one resin layer comprises a resin having softening point A of 20° C. or higher and 60° C. or lower, and
the nonwoven fabric has an air permeability of 30 cc/cm$^2$/sec or more and 300 cc/cm$^2$/sec or less.

[2] The nonwoven fabric for reinforcing foam molded articles according to [1], wherein the nonwoven fabric has an adhesiveness to a mold at 60° C. of 1.5 N/ø22 mm or more.

[3] A nonwoven fabric for reinforcing foam molded articles, comprising a reinforcing nonwoven layer and at least one resin layer, wherein
the reinforcing nonwoven layer and the at least one resin layer are laminated,
the reinforcing nonwoven layer comprises a discontinuous part including a magnetic material,
the at least one resin layer comprises a resin having a melting point of 30° C. or higher and 60° C. or lower, the resin has a melting energy of 30 J/g or more and 100 J/g or less, and the nonwoven fabric has an air permeability of 30 cc/cm$^2$/sec or more and 300 cc/cm$^2$/sec or less.

[4] The nonwoven fabric for reinforcing foam molded articles according to any of [1] to [3], wherein the at least one resin layer comprises a plurality of resin layers, the plurality of resin layers are laterally spaced from each other, and each of the plurality of resin layers has a linear shape or a random shape.

[5] The nonwoven fabric for reinforcing foam molded articles according to any of [1] to [3], wherein the at least one resin layer has a dot shape.

Effects of the Invention

A nonwoven fabric for reinforcing foam molded articles of the present invention comprises a reinforcing nonwoven layer and at least one resin layer. The reinforcing nonwoven layer and the resin layer are laminated, and the reinforcing nonwoven layer has a discontinuous part including a magnetic material to improve an adhesiveness to a mold, and further, a resin softening at a mold temperature while foaming is laminated with the nonwoven layer to form the resin layer. In addition, an air permeability of the nonwoven fabric for reinforcing foam molded articles is kept above a certain level to release gas generated while foaming to obtain a good-looking cushion materials.

Consequently, the reinforcing nonwoven fabric that can improve handleability has been obtained. The reinforcing nonwoven fabric is used with a conventional and not refined mold, only sewed, and can be efficiently set to the mold.

The nonwoven fabric for reinforcing foam molded materials has the advantage of being used in the way exactly the same as conventionally used, because the nonwoven fabric for reinforcing foam molded materials does not contaminate a mold after foam molding and has no effect on moldability of foam molded materials.

EMBODIMENTS FOR CARRYING OUT THE INVENTION

Figure 1:
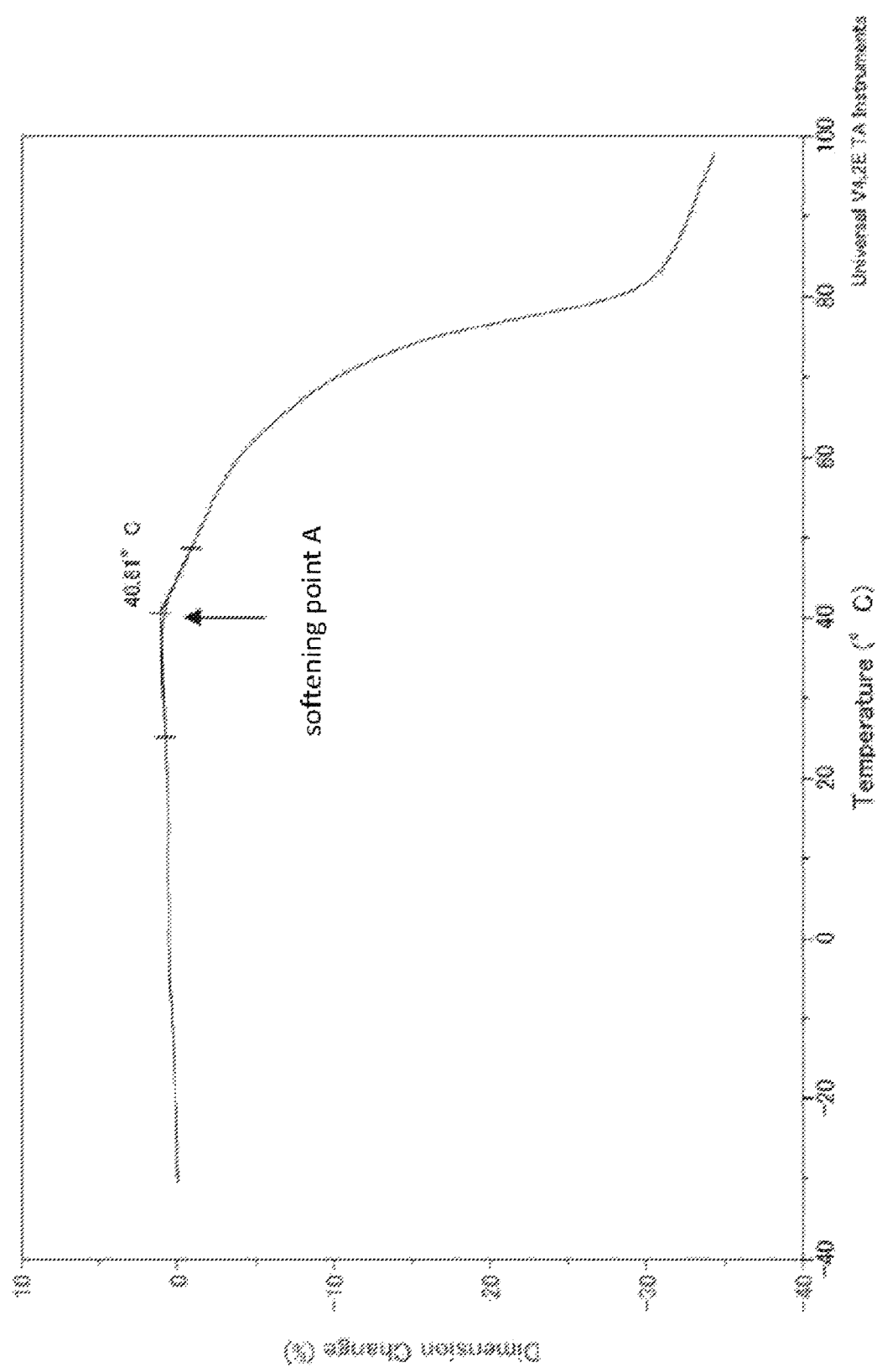
FIG. 1 is a graph showing an example of measured softening point A.

All nonwoven fabrics known from the related art can be applied to a reinforcing nonwoven layer of the nonwoven fabric for reinforcing foam molded articles of the present invention, however, it is preferable that: the nonwoven fabric has a tear strength of 20 N or more; the tear strength after foaming is 10 N/cm or more (cutting out the reinforcing nonwoven layer after foaming, and measuring the strength in accordance with JIS L 1913 (2010)); and the nonwoven fabric has the high density portion that decreases bleeding of urethane.

As a resin constituting the nonwoven fabric used in the reinforcing nonwoven layer, polyester, polyolefin, and polyamide are preferable, and polyester and polyolefin, which are inexpensive and versatile thermoplastic resin, are especially preferable. As a polyester, homopolyester such as polybutylene terephthalate (PBT), polyethylene terephthalate (PET), polybutylene naphthalate (PBN), polyethylene naphthalate (PEN), polycyclohexanedimethyl terephthalate (PCHT), polytrimethylene terephthalate (PTT); and copolyester thereof are exemplified. As a polyolefin, polyethylene, polypropylene, and others are exemplified.

Methods for producing nonwoven fabrics used in the reinforcing nonwoven layer, for instance, can be exemplified by: spun bond method and melt blown method for filament nonwoven fabrics; mechanical entangling methods such as needle punch method and spun laced method, chemical bond method, and thermal bond method for staple fiber nonwoven fabrics; and combinations thereof.

In cases where a reinforcing nonwoven layer constitutes a nonwoven fabric via spun bond method, the reinforcing nonwoven layer is preferably obtained by: laminating a bulky nonwoven fabric having a basis weight of 30 to 200 g/m$^2$ and a porosity of 90 to 94% with a dense nonwoven fabric having a basis weight of 20 to 100 g/m$^2$ and a porosity of 87 to 91%, and integrating them via needle punch method; using a needle punch spun bonding nonwoven fabric that is not laminated has a difference of density in the thickness direction and has roles of urethane reinforcing layer and a layer preventing bleeding of urethane while forming; or using a spun bonding nonwoven fabric that is constituted by a crimped filament nonwoven fabric having a crimp number of 2 to 40 crimps/25 mm and a fiber diameter of 1 to 30 µm, and that has a basis weight of 50 to 200 g/m$^2$ and a thickness of 0.5 to 2.0 mm.

In cases where a reinforcing nonwoven layer constitutes a composite nonwoven layer of a staple fiber nonwoven fabric and a spun bonding nonwoven fabric, the composite nonwoven layer is preferably obtained by: laminating the spun bonding nonwoven fabric having a fiber diameter of 1 to 23 dtex and a basis weight of 20 to 100 g/m$^2$ with a staple fiber card web on one side or on both sides, and integrating them via needle punch method.

A magnetic material used in a discontinuous part formed in a reinforcing nonwoven layer is not particularly limited, however, ferromagnets such as iron, cobalt, nickel, and other alloys are preferable, and versatile iron is more preferable. The position in which the magnetic material is installed is preferably discontinuous, being limited to the location corresponding to that of a mold in which a magnet is set, so that installing the plurality of magnetic materials to match the shape of the mold can improve an adhesiveness of the reinforcing nonwoven fabric. Installing the magnetic materials continuously may deteriorate moldability after forming. The position in which the magnetic materials are installed can be both sides of the reinforcing nonwoven layer, however, it is preferable to be on the side opposite to the resin layer to prevent the magnetic materials from dropping off. The process for installing the magnetic materials in the reinforcing nonwoven layer is also not particularly limited, however, for preventing the magnetic materials from dropping off, adhering a seal-like material combined with resins or the like to the nonwoven layer is easy and preferable.

As a resin layer of the nonwoven fabric for reinforcing foam molded articles of the present invention, using a resin having softening point A of 20° C. or higher and 60° C. or lower, preferably 30° C. or higher and lower than 55° C., more preferably 35° C. or higher and lower than 50° C. improve the adhesiveness to a mold. In cases where softening point A is lower than 20° C., the adhesiveness is high even at a room temperature during usual storage, so that stacking the plurality of the fabrics during storage causes worse handleability, and sometimes they adhere to each other completely. In cases where softening point A is higher than 60° C., the adhesiveness is not high enough at a molding temperature, and the setting characteristic of the nonwoven fabric for reinforcing foam molded articles to the mold becomes worse, which causes problems such as separation of the nonwoven fabric during the operation. Softening point A in the range mentioned above can be obtained by using a resin having Vicat softening temperature of 20° C. or higher and 60° C. or lower.

The kind of the resin is not limited as long as softening point A is in the range mentioned above, and ethylene-vinyl acetate copolymer, ethylene-ethyl acrylate copolymer, ionomer resin, urethane resin, or derivatives thereof can be suitably used.

Additionally, the resin used in the resin layer of the nonwoven fabric for reinforcing foam molded articles of the present invention having a melting point measured by differential scanning calorimetry of 30° C. or higher and 60° C. or lower, preferably 30° C. or higher and lower than 55° C., more preferably 35° C. or higher and lower than 50° C. can improve the adhesiveness to a mold. In cases where the melting point is lower than 30° C., the adhesiveness is high even at a room temperature during usual storage, so that handleability of the plurality of the fabrics may become worse in the case the fabrics are stacked and stored, and sometimes they adhere to each other completely. In cases where the melting point is higher than 60° C., the adhesiveness is not high enough at a molding temperature, and the adhesiveness of the nonwoven fabric for reinforcing form molded articles to the mold becomes worse, which causes problems such as separation of the nonwoven fabric during the operation.

Furthermore, the resin used in the resin layer of the nonwoven fabric for reinforcing foam molded articles of the present invention having a melting energy measured by differential scanning calorimetry of 30 J/g or more and 100 J/g or less, preferably 40 J/g or more and 80 J/g or less, more preferably 50 J/g or more and 70 J/g or less improve the adhesiveness to a mold. In cases where the melting energy is less than 30 J/g, the adhesiveness is high even at a room temperature during usual storage, so that handleability of the plurality of the fabrics may become worse in the case the fabrics are stacked and stored, and sometimes they adhere to each other completely. In cases where, the melting energy is more than 100 J/g, it takes long to adhere to a mold, which causes problems of bad handleability.

The kind of the resin is not particularly limited as long as the melting point and the melting energy of the resin used in the resin layer are in the range mentioned above, and ethylene-vinyl acetate copolymer, ethylene-ethyl acrylate copolymer, ionomer resin, urethane resin, or derivatives thereof can be suitably used.

An air permeability of the nonwoven fabric in which the reinforcing nonwoven layer and the resin layer are laminated is preferably 30 cc/cm$^2$/sec or more, more preferably 40 cc/cm$^2$/sec or more and 300 cc/cm$^2$/sec or less, even more preferably 50 cc/cm$^2$/sec or more and 250 cc/cm$^2$/sec or less. In cases where the air permeability is less than 30 cc/cm$^2$/sec, gas generated while urethane forming is difficult to be released, which causes flaws in urethane foam molded articles. In cases where the air permeability is more than 300 cc/cm$^2$/sec, urethane bleeds from the nonwoven fabric for reinforcing foam molded articles, which may cause abnormal noise because of a contact with metal springs.

The amount of the resin used in the resin layer is not particularly limited, however, it is preferably 10 g/m$^2$ or more and 60 g/m$^2$ or less, more preferably 10 g/m$^2$ or more and 50 g/m$^2$ or less, even more preferably 15 g/m$^2$ or more and 40 g/m$^2$ or less. In cases where the amount of the resin is less than 10 g/m$^2$, the adhesiveness of the nonwoven fabric for reinforcing foam molded articles to a mold may not be enough, while in cases where the amount of the resin is more than 60 g/m$^2$, enough air permeability may be difficult to be attained.

To laminate the resin layer and to ensure the most suitable air permeability, any method known to the art such as resin extrusion laminating process, tandem extrusion laminating process, dry laminating process, curtain spraying process, and powder laminating process can be used. In addition, the available processes also include dot processing such as printing process. Via these processes, an area ratio of the laminated resin layer to the area of the reinforcing nonwoven fabric is 10% or more and 90% or less to the area of the reinforcing nonwoven fabric, more preferably 20% or more and 80% or less, and even more preferably 30% or more and 70% or less. In cases where the area ratio of the resin layer is less than 10%, the adhesiveness to a mold is insufficient, while in cases where the area ratio of the resin layer is more than 90%, enough air permeability is difficult to be ensured.

As the resin layer that allow more suitable air permeability and adhesiveness to a mold, it is preferable that the resin layer comprises a plurality of resin layers, and the plurality of resin layers are laminated with lateral spacing, and each of the resin layers has a linear shape or a random shape, or the at least one resin layer has a dot shape.

In cases where each of the resin layers has a linear shape, the width of each of the resin layers is preferably 0.3 mm to 10 mm, and the spacing between adjacent resin layers is preferably 1 mm to 10 mm.

In cases where each of the resin layers has a random shape, each random shape of the resin layers is preferably not continuous with each other, and the amount of the resin is preferably 50 g/m$^2$ or less.

In cases where the laminated resin layer has a dot shape, the shape of dots is not particularly designated and includes round shape and rhomboidal shape. The size of dots is also not particularly designated, and a diameter of dots that is converted as a circle is preferably 1 mm or more and 10 mm or less. The dots can be arranged in lattice shape, zigzag shape, or others.

The adhesiveness to a mold at 60° C. of the nonwoven fabric for reinforcing foam molded articles in which the reinforcing nonwoven layer and the resin layer are laminated is obtained in the way described later, and is preferably 1.5 N/ø22 mm or more, more preferably 2.0 N/ø22 mm or more and less than 20.0 N/ø22 mm. In cases where the adhesiveness to a mold is less than 1.5 N/ø22 mm, the reinforcing nonwoven layer may separate in the process after being adhered to a mold. In cases where the adhesiveness to a mold is more than 20.0 N/ø22 mm, the reinforcing nonwoven fabric not only has difficulties in being removed from a mold but also may separate from urethane after foaming.

Additionally, an adhesiveness to a mold at 30° C. of the nonwoven fabric at is preferably 1.5 N/ø22 mm or less, and more preferably 1.0 N/ø22 mm or less. In cases where the adhesiveness to a mold at 30° C. is more than 1.5 N/ø22 mm, the nonwoven fabrics adhere to each other when being kept stacked or rolled during storage, so that handleability is made worse.

The nonwoven fabric for reinforcing foam molded articles of the present invention is not limited to a specific use of cushion. As a reinforcing nonwoven fabric for molding foam molded articles with a mold, the nonwoven fabric of the present invention is also useful for every kind of interior materials for vehicle, building materials, surface foam nodded materials of electrical appliances, and others.

EXAMPLES

Hereinafter, the present invention will be described in more detail with reference to examples and comparative examples, but the present invention is not to be limited by the following examples.

Evaluation methods used in the examples and the comparative examples are described below.

(1) Softening Point A (° C.)

A piece of a resin layer was sampled from a reinforcing nonwoven fabric. Softening point A was determined by thermomechanical analysis (TMA) with "Q400" manufactured by TA instrument. As a probe, a probe needle was used, and the measurement condition was that: the load was 0.1 N, the temperatures were −30° C. to 100° C., the heating-up speed was 5° C./min, and in a nitrogen gas atmosphere. As exemplified in FIG. 1, softening point A was defined to be an intersection of two tangents.

(2) Melting Point of Resin (° C.)

Figure 2:
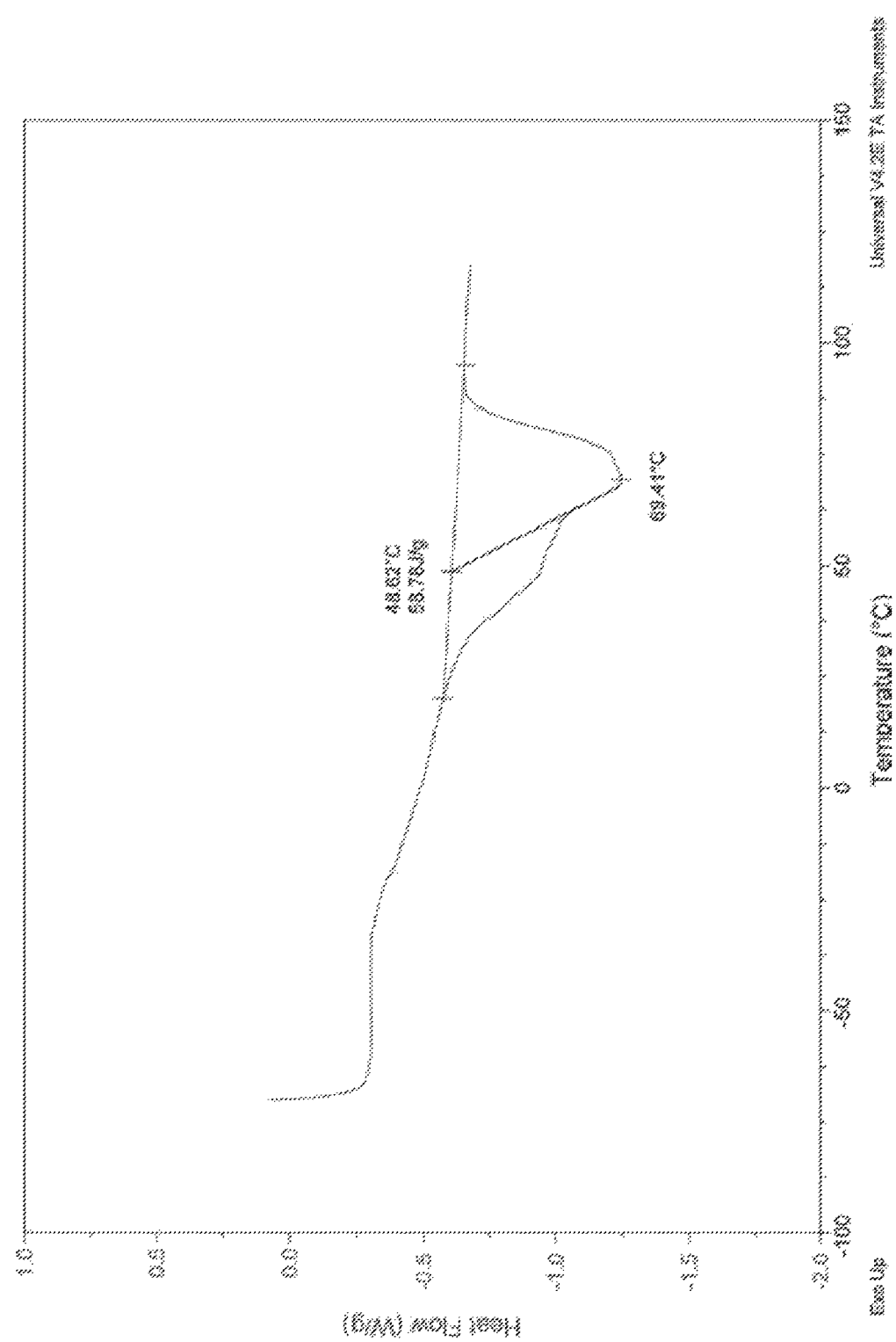
FIG. 2 is a graph showing an example of measured melting point of a resin.

From a nonwoven fabric for reinforcing foam molded articles, 4 to 5 mg of only resin part was sampled. In cases where pieces of the nonwoven layer happened to be also sampled with the resin, the pieces of the nonwoven were not removed and the mixture was measured. Q100 manufactured by TA instrument was used, and the measurement condition was that: the heating-up speed was 20° C./min from −70° C. to 120° C., and in a nitrogen gas atmosphere. From resulting chart, melting point was defined to be an intersection of the base line (20° C. to 95° C.) shown in FIG. 2 and a tangent. In the case of FIG. 2, the melting point was 48.62° C.

(3) Melting Energy of Resin (J/g)

From the chart obtained in the measurement described above (2), melting energy was obtained. In the case of FIG. 1, the melting energy was 58.78 J/g.

(4) Vicat Softening Temperature (° C.)

Vicat softening temperature was measured in accordance with JIS K 7206 (1999) "Plastics—Thermoplastic materials—Determination of Vicat softening temperature (VST)."

(5) Air Permeability (cc/cm$^2$/sec)

Air permeability was measured in accordance with JIS L 1096 (2010) "Testing methods for woven and knitted fabrics" 8.26.1 A "Frazier."

(6) Adhesiveness to a Mold (N/ø22 mm)

A test specimen was cut into the width of 25 mm and the length of 100 mm. One end of the test specimen was compressed against one end of metal plate (SS400 flat bar, width: 30 mm, length: 100 mm) with a terminal load of 2 kgf/ø22 mm using 51.6 kPa "Gage Mate" manufactured by Kyowa Electronic Instruments Co., Ltd. at 30° C.±3° C. and 60° C.±3° C. for 10 seconds. Thereafter, the metal plate was held by an upper chuck of a tensile tester manufactured by Shimadzu Corporation, and the other end of the test specimen was held by a lower chuck to make the spacing between the upper and the lower chuck 10 mm (If the test specimen has magnets, the magnet sheets were arranged in a square shape so as not to extend outward from the compressed part of the terminal.) The tensile test was performed at the tensile speed of 100 mm/min to determine the maximum strength.

(7) Handleability of the Reinforcing Nonwoven Fabric at a Room Temperature of 30° C.

Ten sheets of test specimen cut into the size of 20 cm×20 cm were stacked, and applied a load of 10 kg/400 cm$^2$, and then let stand for 24 hours in the room which temperature was 30° C. Subsequently, the load was removed, and when each sheet was taken out one by one, handleability was evaluated in the way described below.

Good: Each sheet could be taken out without fusion in each sheet.

Bad: Each sheet was difficult to be taken out because a part or all of each sheet were fusion bonded.

(8) Area Ratio of the Resin Layer (%)

The side of the resin layer of the reinforcing nonwoven fabric was observed with a SEM. From the SEM image, area of the resin layer per unit area was measured and shown in percentage.

(9) Foam Moldability

Good: The surface of foam molded articles did not have traces of gas, and the articles were beautifully foamed.

Bad: The surface of foam molded articles had traces of gas, and the articles had flaws including pockmarks.

Example 1

Ethylene vinyl acetate copolymer resin produced by Yasuhara Chemical Co., Ltd. (Vicat softening temperature: 39° C.) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 1 mm; the horizontal spacing between each resin layer was 2 mm; and the amount of the resin was 20 g/m$^2$. Additionally, a plurality of 1 cm$^2$ of commercially available magnet sheets were cut and adhered to the side opposite to the resin layer of the nonwoven fabric in the center of the width direction at intervals of 20 cm.

Example 2

HIRODINE7054 produced by Yasuhara Chemical Co., Ltd. (ethylene-vinyl acetate copolymer, Vicat softening temperature: 42° C.) was extruded through a T-die on the one side of nonwoven TAFNEL "ESE444" produced by Mitsui Chemical, Inc. to be laminated under the following conditions: each of the plurality of resin layers had a linear shape and was parallel to the longitudinal direction; the width of each resin layer was 1 mm; the horizontal spacing between each resin layer was 2 mm; and the amount of the resin was 30 g/m$^2$. Additionally, a plurality of 1 cm$^2$ of commercially available magnet sheets were cut and adhered to the side opposite to the resin layer of the nonwoven fabric in the central of the width direction at intervals of 20 cm.

Example 3

HIRODINE7504 produced by Yasuhara Chemical Co., Ltd. (ethylene-vinyl acetate copolymer, Vicat softening temperature: 42° C.) was extruded through a T-die on the one side of nonwoven TAFNEL "ESE444" produced by Mitsui Chemical, Inc. to be laminated under the following conditions: each of the plurality of resin layers had a linear shape and was parallel to the longitudinal direction; the width of each resin layer was 2 mm; the horizontal spacing between each resin layer was 2 mm; and the amount of the resin was 30 g/m$^2$. Additionally, a plurality of 1 cm$^2$ of commercially available magnet sheets were cut and adhered to the side opposite to the resin layer of the nonwoven fabric in the central of the width direction at intervals of 20 cm.

Example 4

A plurality of resin layers of HIRODINE7504 produced by Yasuhara Chemical Co., Ltd. (ethylene-vinyl acetate copolymer, Vicat softening temperature: 42° C.) was laminated by screen printing on the white side of nonwoven VOLANS "CRE3080" produced by Toyobo Co., Ltd. under the following conditions: each resin layer had a dot shape; and the amount of the resin was 20 g/m². Additionally, a plurality of 1 cm² of commercially available magnet sheet were cut and adhered to the side opposite to the resin layer of the nonwoven fabric in the central of the width direction at intervals of 20 cm.

Example 5

A plurality of resin layers of HIRODINE7504 produced by Yasuhara Chemical Co., Ltd. (ethylene-vinyl acetate copolymer, Vicat softening temperature: 42° C.) was laminated by hot melt spraying on nonwoven VOLANS "CRE3080" produced by Toyobo Co., Ltd. under the following conditions: each resin layer had a random shape; and the amount of the resin was 20 g/m². Additionally, a plurality of 1 cm² of commercially available magnet sheet were cut and adhered to the side opposite to the resin layer of the nonwoven fabric in the central of the width direction at intervals of 20 cm.

Comparative Example 1

HIRODINE7536 produced by Yasuhara Chemical Co., Ltd. (ethylene-vinyl acetate copolymer, Vicat softening pointemperature: 83° C.) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 1 mm; the horizontal spacing between each resin layer was 2 mm; and the amount of the resin was 20 g/m².

Comparative Example 2

Acrylic resin ATR-1 produced by Saiden Chemical Industry Co., Ltd. was applied to the white side of nonwoven VOLANS "CRE3080" produced by Toyobo Co., Ltd. such that the amount of the acrylic resin was 20 g/m². The acrylic resin ATR-1 had high viscosity at a room temperature (20° C.), so that a test specimen could not be sampled and softening point A could not be measured.

Comparative Example 3

HIRODINE7528 produced by Yasuhara Chemical Co., Ltd. (ethylene-vinyl acetate copolymer, Vicat softening temperature: 40° C.) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 2 mm; the horizontal spacing between each resin layer was 0.1 mm; and the amount of the resin was 50 g/m².

Comparative Example 4

Ethylene-vinyl acetate copolymer resin produced by Yasuhara Chemical Co., Ltd. (Vicat softening temperature: 39° C.) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 1 mm; the horizontal spacing between each resin layer was 2 mm; and the amount of the resin was 20 g/m².

Each property of the nonwoven fabrics for reinforcing foam molded articles obtained in Examples 1 to 5 and Comparative Examples 1 to 4 was shown in Table 1.

TABLE 1

| | Example 1 | Example 2 | Example 3 | Example 4 | Example 5 | Comparative Example1 | Comparative Example 2 | Comparative Example 3 | Comparative Example 4 |
|---|---|---|---|---|---|---|---|---|---|
| softening point A (° C.) | 33.0 | 42.5 | 42.5 | 42.5 | 42.5 | 83.4 | — | 40.6 | 33.0 |
| melting point of resin (° C.) | 47 | 48 | 48 | 48 | 48 | 80 | impossible to measure | 48 | 47 |
| melting energy of resin (J/g) | 35 | 62 | 62 | 62 | 62 | 75 | 0 | 58 | 35 |
| air permeability (cc/cm²/sec) | 125 | 100 | 80 | 130 | 50 | 125 | 24 | 19 | 118 |
| area ratio of resin (%) | 30 | 33 | 33 | 25 | — | 30 | 30 | 95 | 30 |
| adhesiveness to a mold 30° C. (N/φ22 mm) | 0.7 | 0.6 | 0.5 | 0.8 | 0.7 | 0 | 10 | 0 | 0 |
| 60° C. | 3.5 | 2.5 | 3.0 | 2.6 | 2.7 | 0 | 3.5 | 2.1 | 1.3 |
| handleability of nonwoven sheet | good | good | good | good | good | good | bad | good | good |
| moldability | good | good | good | good | good | good | bad | bad | good |

Example 6

Ethylene-vinyl acetate copolymer resin produced by Yasuhara Chemical Co., Ltd. (Vicat softening temperature: 39° C.) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 1 mm; the horizontal spacing between each resin layer was 2 mm; and the amount of the resin was 30 g/m². Additionally, a plurality of 1 cm² of commercially available magnet sheets were cut and adhered to the side opposite to the resin layer of the nonwoven fabric in the central of the width direction at intervals of 20 cm.

Example 7

HIRODINE7528 produced by Yasuhara Chemical Co., Ltd. (ethylene-vinyl acetate copolymer, Vicat softening temperature: 40° C.) was extruded through a T-die on the one side of nonwoven TAFNEL "ESE444" produced by Mitsui Chemical, Inc. to be laminated under the following conditions: each of the plurality of resin layers had a linear shape and was parallel to the longitudinal direction; the width of each resin layer was 1 mm; the horizontal spacing between each resin layer was 2 mm; and the amount of the resin was 20 g/m². Additionally, a plurality of 1 cm² of commercially available magnet sheets were cut and adhered to the side opposite to the resin layer of the nonwoven fabric in the central of the width direction at intervals of 20 cm.

Example 8

HIRODINE7504 produced by Yasuhara Chemical Co., Ltd. (ethylene-vinyl acetate copolymer, Vicat softening temperature: 42° C.) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 2 mm; the horizontal spacing between each resin layer was 2 mm; and the amount of the resin was 20 g/m². Additionally, a plurality of 1 cm² of commercially available magnet sheet were cut and adhered to the side opposite to the resin layer of the nonwoven fabric in the central of the width direction at intervals of 20 cm.

Example 9

A plurality of resin layers of HIRODINE7528 produced by Yasuhara Chemical Co., Ltd. (ethylene-vinyl acetate copolymer, Vicat softening temperature: 40° C.) was laminated by screen printing on the white side of nonwoven VOLANS "CRE3080" produced by Toyobo Co., Ltd. under the following conditions: each resin layer had a dot shape; and the amount of the resin was 30 g/m². Additionally, a plurality of 1 cm² of commercially available magnet sheets were cut and adhered to the side opposite to the resin layer of the nonwoven fabric in the central of the width direction at intervals of 20 cm.

Example 10

A plurality of resin layers of HIRODINE7528 produced by Yasuhara Chemical Co., Ltd. (ethylene-vinyl acetate copolymer, Vicat softening temperature: 40° C.) was laminated by hot melt spraying on the white side of nonwoven VOLANS "CRE3080" produced by Toyobo Co., Ltd. under the following conditions: each resin layer had a random shape; and the amount of the resin was 30 g/m². Additionally, a plurality of 1 cm² of commercially available magnet sheets were cut and adhered to the side opposite to the resin layer of the nonwoven fabric in the central of the width direction at intervals of 20 cm.

Comparative Example 5

Ethylene vinyl acetate copolymer resin produced by Yasuhara Chemical Co., Ltd. (Vicat softening temperature: 39° C.) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 1 mm; the horizontal spacing between each resin layer was 2 mm; and the amount of the resin was 30 g/m².

Comparative Example 6

HIRODINE7528 produced by Yasuhara Chemical Co., Ltd. (ethylene-vinyl acetate copolymer, Vicat softening temperature: 40° C.) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 1 mm; the horizontal spacing between each resin layer was 9 mm; and the amount of the resin was 5 g/m².

Each property of the nonwoven fabrics for reinforcing foam molded articles obtained in Examples 6 to 10 and Comparative Examples 5 to 6 was shown in Table 2.

TABLE 2

|  | Example 6 | Example 7 | Example 8 | Example 9 | Example 10 | Comparative Example 5 | Comparative Example 6 |
| --- | --- | --- | --- | --- | --- | --- | --- |
| softening point A (° C.) | 33.0 | 40.6 | 42.5 | 40.6 | 40.6 | 33.0 | 40.6 |
| melting point of resin (° C.) | 47 | 48 | 48 | 48 | 48 | 47 | 48 |
| melting energy of resin (J/g) | 35 | 58 | 62 | 58 | 58 | 35 | 58 |
| air permeability (cc/cm²/sec) | 115 | 90 | 98 | 126 | 45 | 125 | 126 |
| area ratio of resin (%) | 33 | 30 | 30 | 28 | — | 30 | 9 |
| adhesiveness to a mold 30° C. (N/φ22 mm) | 0.5 | 0.6 | 0.8 | 0.7 | 0.6 | 0 | 0 |
| adhesiveness to a mold 60° C. (N/φ22 mm) | 3.8 | 2.3 | 2.9 | 2.4 | 3.0 | 1.4 | 0.3 |
| handleability of nonwoven sheet | good | good | good | good | good | good | good |
| moldability | good | good | good | good | good | good | good |

Example 11

Ethylene-vinyl acetate copolymer resin produced by Yasuhara Chemical Co., Ltd. (Vicat softening temperature: 39° C.) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 2 mm; the horizontal spacing between each resin layer was 2 mm; and the amount of the resin was 20 g/m².

Additionally, a plurality of 1 cm² of commercially available magnet sheets were cut and adhered to the side opposite to the resin layer of the nonwoven fabric in the central of the width direction at intervals of 20 cm.

Example 12

Ethylene-vinyl acetate copolymer resin produced by Yasuhara Chemical Co., Ltd. (Vicat softening temperature: 40° C.) was extruded through a T-die on the one side of nonwoven TAFNEL "ESE444" produced by Mitsui Chemical, Inc. to be laminated under the following conditions: each of the plurality of resin layers had a linear shape and was parallel to the longitudinal direction; the width of each resin layer was 1 mm; the horizontal spacing between each resin layer was 2 mm; and the amount of the resin was 30 g/m². Additionally, a plurality of 1 cm² of commercially available magnet sheet were cut and adhered to the side opposite to the resin layer of the nonwoven fabric in the central of the width direction at intervals of 20 cm.

Example 13

Ethylene-vinyl acetate copolymer resin produced by Yasuhara Chemical Co., Ltd. (Vicat softening temperature: 44° C.) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 2 mm; the horizontal spacing between each resin layer was 2 mm; and the amount of the resin was 20 g/m². Additionally, a plurality of 1 cm² of commercially available magnet sheet were cut and adhered to the side opposite to the resin layer of the nonwoven fabric in the central of the width direction at intervals of 20 cm.

Example 14

A plurality of resin layers of HIRODINE7528 produced by Yasuhara Chemical Co., Ltd. (ethylene-vinyl acetate copolymer) was laminated by screen printing on the white side of nonwoven VOLANS "CRE3080" produced by Toyobo Co., Ltd. under the following conditions: each resin layer had a dot shape; and the amount of the resin was 20 g/m². Additionally, a plurality of 1 cm² of commercially available magnet sheet were cut and adhered to the side opposite to the resin layer of the nonwoven fabric in the central of the width direction at intervals of 20 cm.

Example 15

A plurality of resin layers of HIRODINE7528 produced by Yasuhara Chemical Co., Ltd. (ethylene-vinyl acetate copolymer) was laminated by hot melt spraying on the white side of nonwoven VOLANS "CRE3080" produced by Toyobo Co., Ltd. under the following conditions: each resin layer had a random shape; and the amount of the resin was 20 g/m². Additionally, a plurality of 1 cm² of commercially available magnet sheet were cut and adhered to the side opposite to the resin layer of the nonwoven fabric in the central of the width direction at intervals of 20 cm.

Comparative Example 7

HIRODINE7536 produced by Yasuhara Chemical Co., Ltd. (ethylene-vinyl acetate copolymer) was extruded through a T-die on the white side of nonwoven VOLANS "CRE3080" produced by Toyobo Co., Ltd. to be laminated under the following conditions: each of the plurality of resin layers had a linear shape and was parallel to the longitudinal direction; the width of each resin layer was 2 mm; the horizontal spacing between each resin layer was 2 mm; and the amount of the resin was 20 g/m².

Each property of the nonwoven fabrics for reinforcing foam molded articles obtained in Examples 11 to 15 and Comparative Example 7 was shown in Table 3.

TABLE 3

|  | Example 11 | Example 12 | Example 13 | Example 14 | Example 15 | Comparative Example 7 |
|---|---|---|---|---|---|---|
| softening point A (° C.) | 33.0 | 40.0 | 44.0 | 40.6 | 40.6 | 83.4 |
| melting point of resin (° C.) | 47 | 47 | 49 | 48 | 48 | 80 |
| melting energy of resin (J/g) | 35 | 42 | 70 | 58 | 56 | 75 |
| air permeability (cc/cm²/sec) | 115 | 90 | 97 | 133 | 85 | 125 |
| area ratio of resin (%) | 50 | 33 | 50 | 30 | — | 33 |
| adhesiveness to a mold (N/φ22 mm) 30° C. | 0.7 | 0.6 | 0.8 | 0.5 | 0.6 | 0 |
| adhesiveness to a mold (N/φ22 mm) 60° C. | 3.7 | 2.6 | 2.7 | 2.9 | 3.2 | 0 |
| handleability of nonwoven sheet | good | good | good | good | good | good |
| moldability | good | good | good | good | good | good |

INDUSTRIAL APPLICABILITY

The nonwoven fabric for reinforcing foam molded articles of the present invention can be easily adhered to a conventional and not refined mold without contaminating the mold, so that the nonwoven fabric can simplify the producing process from sewing to foam molding and can greatly improve the productivity, which is a significant contribution to the industry.

The invention claimed is:

1. A nonwoven fabric for reinforcing foam molded articles, comprising a reinforcing nonwoven layer and at least one resin layer, wherein
   the reinforcing nonwoven layer and the at least one resin layer are laminated,
   the reinforcing nonwoven layer comprises a discontinuous part including a magnetic material, the magnetic material is on a first side of the reinforcing nonwoven layer, the at least one resin layer is on a second side of the reinforcing nonwoven layer, the first side is a back side of the second side, the at least one resin layer comprises a resin having softening point A in a range of from 20° C. to 60° C., and the nonwoven fabric has an air permeability in a range of from 30 cc/cm$^2$/sec to 300 cc/cm$^2$/sec.

2. The nonwoven fabric for reinforcing foam molded articles according to claim 1, wherein the nonwoven fabric has an adhesiveness to a mold at 60° C. of 1.5 N/ø22 mm or more.

3. The nonwoven fabric for reinforcing foam molded articles according to claim 2, wherein the at least one resin layer comprises a plurality of resin layers, the plurality of resin layers are laterally spaced from each other, and each of the plurality of resin layers has a linear shape or a random shape.

4. The nonwoven fabric for reinforcing foam molded articles according to claim 2, wherein the at least one resin layer has a dot shape.

5. The nonwoven fabric for reinforcing foam molded articles according to claim 1, wherein the at least one resin layer comprises a plurality of resin layers, the plurality of resin layers are laterally spaced from each other, and each of the plurality of resin layers has a linear shape or a random shape.

6. The nonwoven fabric for reinforcing foam molded articles according to claim 1, wherein the at least one resin layer has a dot shape.

7. A nonwoven fabric for reinforcing foam molded articles, comprising a reinforcing nonwoven layer and at least one resin layer, wherein the reinforcing nonwoven layer and the at least one resin layer are laminated, the reinforcing nonwoven layer comprises a discontinuous part including a magnetic material, the magnetic material is on a first side of the reinforcing nonwoven layer, the at least one resin layer is on a second side of the reinforcing nonwoven layer, the first side is a back side of the second side, the at least one resin layer comprises a resin having a melting point in a range of from 30° C. to 60° C., the resin has a melting energy in a range of from 30 J/g to 100 J/g, and the nonwoven fabric has an air permeability in a range of from 30 cc/cm$^2$/sec to 300 cc/cm$^2$/sec.

8. The nonwoven fabric for reinforcing foam molded articles according to claim 7, wherein the at least one resin layer comprises a plurality of resin layers, the plurality of resin layers are laterally spaced from each other, and each of the plurality of resin layers has a linear shape or a random shape.

9. The nonwoven fabric for reinforcing foam molded articles according to claim 7, wherein the at least one resin layer has a dot shape.

10. A nonwoven fabric for reinforcing foam molded articles, comprising a reinforcing nonwoven layer and at least one resin layer, wherein the reinforcing nonwoven layer and the at least one resin layer are laminated, the reinforcing nonwoven layer comprises a discontinuous part including a magnetic material, the at least one resin layer comprises a resin having softening point A in a range of from 20° C. to 60° C., and the nonwoven fabric has an air permeability in a range of from 30 cc/cm$^2$/sec to 300 cc/cm$^2$/sec, an adhesiveness to a mold at 60° C. of 1.5 N/ø22 mm or more, and an adhesiveness to a mold at 30° C. of 1.5 N/ø22 mm or less.

11. A nonwoven fabric for reinforcing foam molded articles, comprising a reinforcing nonwoven layer and at least one resin layer, wherein the reinforcing nonwoven layer and the at least one resin layer are laminated, the reinforcing nonwoven layer comprises a discontinuous part including a magnetic material, the at least one resin layer comprises a resin having a melting point in a range of from 30° C. to 60° C., the resin has a melting energy in a range of from 30 J/g to 100 J/g, and the nonwoven fabric has an air permeability in a range of from 30 cc/cm$^2$/sec to 300 cc/cm$^2$/sec, an adhesiveness to a mold at 60° C. of 1.5 N/ø22 mm or more, and an adhesiveness to a mold at 30° C. of 1.5 N/ø22 mm or less.

* * * * *